United States Patent
Sohn et al.

(10) Patent No.: US 10,533,062 B2
(45) Date of Patent: Jan. 14, 2020

(54) MODIFIED CONJUGATED DIENE-BASED POLYMER AND METHOD FOR PREPARING THE SAME

(71) Applicant: LG Chem, Ltd., Seoul (KR)

(72) Inventors: Hae Sung Sohn, Daejeon (KR); No Ma Kim, Daejeon (KR); Jin Young Kim, Daejeon (KR); Kyung Chang Seo, Daejeon (KR); Sang Mi Lee, Daejeon (KR)

(73) Assignee: LG Chem, Ltd. (KR)

( * ) Notice: Subject to any disclaimer, the term of this patent is extended or adjusted under 35 U.S.C. 154(b) by 92 days.

(21) Appl. No.: 15/761,320

(22) PCT Filed: Apr. 17, 2017

(86) PCT No.: PCT/KR2017/004114
§ 371 (c)(1),
(2) Date: Mar. 19, 2018

(87) PCT Pub. No.: WO2017/188641
PCT Pub. Date: Nov. 2, 2017

(65) Prior Publication Data
US 2018/0258194 A1    Sep. 13, 2018

(30) Foreign Application Priority Data

Apr. 25, 2016   (KR) .......................... 10-2016-0049962
Apr. 14, 2017   (KR) .......................... 10-2017-0048685

(51) Int. Cl.
| | |
|---|---|
| *C08F 36/04* | (2006.01) |
| *C08L 9/00* | (2006.01) |
| *C08L 23/26* | (2006.01) |
| *C08L 51/04* | (2006.01) |
| *C08K 3/36* | (2006.01) |
| *C08C 19/25* | (2006.01) |
| *C08C 19/22* | (2006.01) |
| *C08F 236/10* | (2006.01) |

(52) U.S. Cl.
CPC .............. *C08C 19/25* (2013.01); *C08C 19/22* (2013.01); *C08F 236/10* (2013.01); *C08F 2800/20* (2013.01)

(58) Field of Classification Search
CPC ....... C08C 19/25; C08C 19/22; C08F 236/10; C08F 2800/20

USPC .......................................................... 524/572
See application file for complete search history.

(56) References Cited

U.S. PATENT DOCUMENTS

| | | |
|---|---|---|
| 4,397,994 A | 8/1983 | Takeuchi et al. |
| 9,623,705 B2 | 4/2017 | Tanaka et al. |
| 9,644,045 B2 | 5/2017 | Kim et al. |
| 10,030,079 B2 | 7/2018 | Lee et al. |
| 2004/0106744 A1 | 6/2004 | Chino et al. |
| 2005/0153138 A1 | 7/2005 | Halladay |
| 2011/0146877 A1 | 6/2011 | Tanaka et al. |
| 2012/0136128 A1 | 5/2012 | Yan et al. |
| 2012/0220716 A1 | 8/2012 | Nakatani et al. |
| 2016/0194411 A1 | 7/2016 | Lee et al. |
| 2016/0208024 A1* | 7/2016 | Kim .......................... C08F 8/42 |

FOREIGN PATENT DOCUMENTS

| | | |
|---|---|---|
| CN | 102482186 A | 5/2012 |
| CN | 102549020 A | 7/2012 |
| JP | 2011195638 A | * 10/2011 |
| JP | 2011195638 A | 10/2011 |
| JP | 2014084368 A | 5/2014 |
| JP | 2016530376 A | 9/2016 |
| JP | 2016531181 A | 10/2016 |
| JP | 2017014140 A | 1/2017 |
| KR | 20120083387 A | 7/2012 |
| KR | 20150044818 A | 4/2015 |
| WO | 2015056994 A1 | 4/2015 |

* cited by examiner

*Primary Examiner* — Kelechi C Egwim
(74) *Attorney, Agent, or Firm* — Lerner, David, Littenberg, Krumholz & Mentlik, LLP

(57) ABSTRACT

The present invention provides a modified conjugated diene-based polymer which includes a functional group derived from a substituted styrene-based compound and a functional group derived from an aminosilane-based compound, a method for preparing the same, and a rubber composition including the same. The modified conjugated diene-based polymer includes the functional group derived from an aminosilane-based compound of Formula 1 and a functional group derived from a substituted styrene-based compound of Formula 2 at both terminals of a main chain, and thus, shows a high modification ratio. When applying the polymer in a rubber composition, excellent affinity with a filler may be shown, and as a result, agglomeration of a filler in the rubber composition may be prevented, and the dispersibility of the filler may be increased, thereby improving the processability of the rubber composition.

15 Claims, No Drawings

MODIFIED CONJUGATED DIENE-BASED POLYMER AND METHOD FOR PREPARING THE SAME

CROSS-REFERENCE TO RELATED APPLICATIONS

This application is a national phase entry under 35 U.S.C. § 371 of International Application No. PCT/KR2017/004114, filed Apr. 17, 2017, which claims priority to Korean Patent Application Nos. 10-2016-0049962, filed on Apr. 25, 2016, and Korean Patent Application No. 10-2017-0048685, filed Apr. 14, 2017, the disclosures of which are incorporated herein by reference.

TECHNICAL FIELD

The present invention relates to a modified conjugated diene-based polymer, a method for preparing the same, and a rubber composition including the same.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based (co)polymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may also be reduced by appropriately adjusting the glass transition temperature.

The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a binder such as a tin compound.

Meanwhile, as the materials for tire treads which come into contact with the ground, materials having low rolling resistance, and excellent wet grip and abrasion resistance which is sufficiently practical are required.

Generally, carbon black and silica are being used as a reinforcing filler of a tire tread, wherein, if the silica is used as the reinforcing filler, advantages that hysteresis loss is low and wet skid resistance is improved may be obtained. However, since the silica having a hydrophilic surface has a low affinity with a conjugated diene-based rubber in comparison to the carbon black having a hydrophobic surface, dispersibility may be poor, and thus, there is a need to use a separate silane coupling agent to improve the dispersibility or provide coupling between the silica and the rubber.

Therefore, attempt of improving dispersibility of silica in a rubber composition and decreasing hysteresis loss by decreasing the movement at the terminals of a rubber molecule via the coupling with silica particles, by introducing a functional group having affinity or reactivity with silica into the terminals of the rubber molecule is being performed, but its effect is insufficient.

Accordingly, the development of rubbers having high affinity with a filler such as silica is required.

DISCLOSURE OF THE INVENTION

Technical Problem

The present invention has been devised to solve the above-mentioned defects of the conventional technique, and an object of the present invention is to provide a modified conjugated diene-based polymer which shows excellent affinity with a filler in a rubber composition by including a functional group derived from a substituted styrene-based compound and a functional group derived from an aminosilane-based compound in the polymer.

Another object of the present invention is to provide a method for preparing the modified conjugated diene-based polymer using a substituted styrene-based compound and an aminosilane-based compound.

Further another object of the present invention is to provide a rubber composition including the modified conjugated diene-based polymer.

Technical Solution

To solve the above-described tasks, according to an embodiment of the present invention, there is provided a modified conjugated diene-based polymer including functional groups derived from an aminosilane-based compound of the following Formula 1 and a substituted styrene-based compound of the following Formula 2:

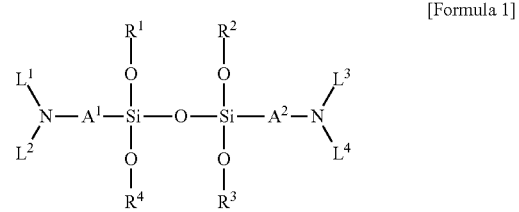

[Formula 1]

[Formula 2]

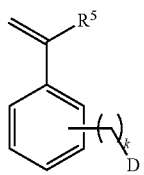

In Formula 1 or Formula 2, $A^1$ and $A^2$ are each independently a substituted or unsubstituted divalent hydrocarbon group of 1 to 20 carbon atoms, $R^1$ to $R^4$ are each independently a substituted or unsubstituted monovalent hydrocarbon group of 1 to 20 carbon atoms, $L^1$ to $L^4$ are each independently a substituted or unsubstituted monovalent hydrocarbon group of 1 to 20 carbon atoms, $R^5$ is a hydrogen atom or a monovalent hydrocarbon group of 1 to 3 carbon atoms, D is a monovalent hydrocarbon group of 1 to 5 carbon atoms, including N or O, and k is an integer of 0 to 5.

In addition, according to another embodiment of the present invention, there is provided a method for preparing the modified conjugated diene-based polymer, including reacting a substituted styrene-based compound of the following Formula 2 and an organo-alkali metal compound in a hydrocarbon solvent to prepare a modification initiator composition (step 1); performing polymerization reaction of conjugated diene-based monomers, or a conjugated diene-based monomer and an aromatic vinyl-based monomer in the presence of the modification initiator composition to prepare an active polymer (step 2); and reacting the active polymer and an aminosilane-based compound of the following Formula 1 (step 3):

[Formula 1]

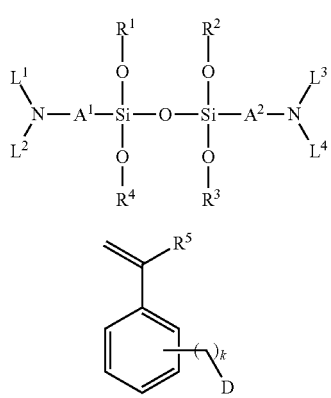

[Formula 2]

In Formula 1 or Formula 2, $A^1$ and $A^2$ are each independently a substituted or unsubstituted divalent hydrocarbon group of 1 to 20 carbon atoms, $R^1$ to $R^4$ are each independently a substituted or unsubstituted monovalent hydrocarbon group of 1 to 20 carbon atoms, $L^1$ to $L^4$ are each independently a substituted or unsubstituted monovalent hydrocarbon group of 1 to 20 carbon atoms, $R^5$ is a hydrogen atom or a monovalent hydrocarbon group of 1 to 3 carbon atoms, D is a monovalent hydrocarbon group of 1 to 5 carbon atoms, including N or O, and k is an integer of 0 to 5.

According to further another embodiment of the present invention, there is provided a rubber composition including the modified conjugated diene-based polymer.

Advantageous Effects

The modified conjugated diene-based polymer according to the present invention includes a functional group derived from an aminosilane-based compound of Formula 1 and a functional group derived from a substituted styrene-based compound of Formula 2 at both terminals of a main chain, and may shown a high modification ratio. Particularly, the polymer includes a tertiary amino group derived from the aminosilane-based compound of Formula 1, and may shown excellent affinity with a filler when applied in a rubber composition. As a result, the agglomeration of the filler in the rubber composition may be prevented, the dispersibility of the filler may be increased, and the processability of the rubber composition may be improved.

In addition, according to the method for preparing a modified conjugated diene-based polymer according to the present invention, a modification initiator composition is obtained by reacting a substituted styrene-based compound of Formula 2 with an organo-metal compound prior to polymerization reaction, polymerization reaction is performed via using the modification initiator composition to form an active polymer employing a functional group derived from the substituted styrene-based compound at one terminal, and reaction with an aminosilane-based compound of Formula 1 is performed to couple a functional group derived from the aminosilane-based compound at the other terminal, to prepare a modified conjugated diene-based polymer having a high modification ratio, in which functional groups are employed at both terminals of a main chain.

Also, the rubber composition according to the present invention includes the modified conjugated diene-based polymer and may improve the physical properties of a manufactured molded article, and particularly, may improve fuel consumption properties, abrasion properties and braking properties in good balance in tires.

Accordingly, the modified conjugated diene-based polymer, the method for preparing the same and the rubber composition including the same according to the present invention may be easily applied to industry which requires a modified conjugated diene-based polymer, for example, tire industry.

BEST MODE FOR CARRYING OUT THE INVENTION

Hereinafter, the present invention will be described in more detail in order to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "monovalent hydrocarbon group" used in the present invention represents a monovalent substituent derived from a hydrocarbon group, and may represent a monovalent atomic group in which carbon and hydrogen are bonded, for example, alkyl, alkenyl, alkynyl, cycloalkyl, cycloalkyl including at least one unsaturated bond, and aryl. The monovalent atomic group may have a linear or branched structure according to the bonding structure thereof.

The term "divalent hydrocarbon group" used in the present invention represents a divalent substituent derived from a hydrocarbon group, and may represent a divalent atomic group in which carbon and hydrogen are bonded, for example, alkylene, alkenylene, alkynylene, cycloalkylene, cycloalkylene including at least one unsaturated bond, and arylene. The divalent atomic group may have a linear or branched structure according to the bonding structure thereof.

The present invention provides a modified conjugated diene-based polymer having high affinity with a filler and showing excellent processability.

The modified conjugated diene-based polymer according to an embodiment of the present invention is characterized in including a functional group derived from an aminosilane-based compound of the following Formula 1 and a functional group derived from a substituted styrene-based compound of the following Formula 2:

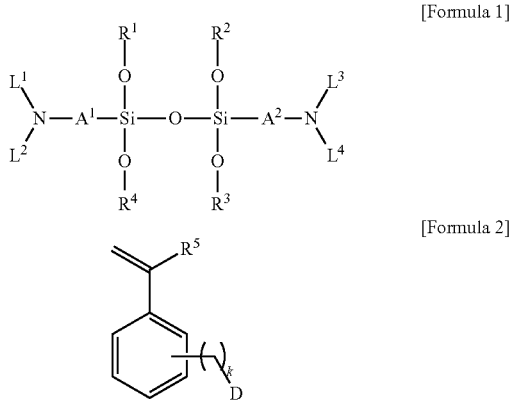

[Formula 1]

[Formula 2]

In Formula 1 or Formula 2, $A^1$ and $A^2$ are each independently a substituted or unsubstituted divalent hydrocarbon group of 1 to 20 carbon atoms, $R^1$ to $R^4$ are each independently a substituted or unsubstituted monovalent hydrocarbon group of 1 to 20 carbon atoms, $L^1$ to $L^4$ are each independently a substituted or unsubstituted monovalent hydrocarbon group of 1 to 20 carbon atoms, $R^5$ is a hydrogen atom or a monovalent hydrocarbon group of 1 to 3 carbon atoms, D is a monovalent hydrocarbon group of 1 to 5 carbon atoms, including N or O, and k is an integer of 0 to 5.

The modified conjugated diene-based polymer according to an embodiment of the present invention may be prepared by the subsequently described preparation method, wherein the functional group derived from the substituted styrene-based compound of Formula 2 may be coupled with one terminal of a main chain and the functional group derived from the aminosilane-based compound of Formula 1 may be coupled with the other terminal. That is, the modified conjugated diene-based polymer according to the present invention may include functional groups at both terminals, and thus, may show a high modification ratio and largely improved physical properties.

Particularly, in the aminosilane-based compound of Formula 1 according to an embodiment of the present invention, an alkoxysilane structure is coupled with an active terminal of a conjugated diene-based polymer, and an Si—O—Si structure and two amino groups coupled with the terminals show affinity with a filler such as silica, and accordingly, the coupling of a filler with a modified conjugated diene-based polymer may be promoted when compared to the conventional modifier including one amino group in a molecule. In addition, since four alkoxy groups are coupled with an adjacent Si—O—Si group, molecular weight control may be easy when compared to the conventional modifier in which six alkoxy groups are coupled with an Si—O—Si—O—Si group, molecular weight distribution of the conjugated diene-based polymer thus prepared is narrow, and coupling degree at the active terminal of the conjugated diene-based polymer is uniform. Accordingly, when observing the change of molecular weight distribution before and after coupling, the molecular weight distribution after coupling is not increased but constant when compared to that before coupling. As a result, the degradation of the physical properties of the modified conjugated diene-based polymer itself is not shown, the agglomeration of the filler in the rubber composition is prevented and the dispersibility of the filler is increased, thereby improving the processability of a rubber composition, particularly, improving fuel consumption properties, abrasion properties and braking properties in good balance in a tire.

In addition, the aminosilane-based compound of Formula 1 may include an amino group, that is, a tertiary amino group, which may prevent the agglomeration of a filler in a rubber composition and may improve the dispersibility of the filler. For example, if silica is used as the filler, agglomeration may easily occur due to the hydrogen bonds between hydroxide groups present on the surface thereof. On the contrary, the tertiary amino group in the aminosilane-based compound inhibits the hydrogen bonds between the hydroxide groups, and the dispersibility of the silica may be improved. In addition, the aminosilane-based compound may include a functional group having affinity with a filler, which is capable of improving the abrasion resistance and processability of a rubber composition due to interaction with a filler together with the amino group, and a functional group having affinity with a solvent, which shows excellent affinity with a solvent used for the modification reaction of a polymer. The functional group having affinity with a filler may particularly be, an alkoxysilane group, and after being introduced in a polymer, condensation reaction with a functional group at the surface of the filler, for example, if the filler is silica, with the silanol group at the surface of the silica, to improve the abrasion resistance and processability of the polymer. Such improving effect may be increased with the increase of the number of the alkoxysilane group. In addition, the functional group having affinity with a solvent may particularly be a hydrocarbon group such as an alkyl group, and may increase the solubility of the aminosilane-based compound with respect to a solvent during the modification reaction of the polymer and as a result, the modification ratio of the polymer may be increased.

In Formula 1, $A^1$ and $A^2$ may be each independently selected from the group consisting of a substituted or unsubstituted alkylene group of 1 to 20 carbon atoms, an arylene group of 6 to 20 carbon atoms, and a combination group thereof. If $A^1$ or $A^2$ is the combination group, particularly, —[$(X)_n$—$(Y)_n$]— (where X and Y are each independently a substituted or unsubstituted alkylene group of 1 to 20 carbon atoms or an arylene group of 6 to 20 carbon atoms, X and Y are not the same, and m and n are each independently an integer of 1 to 3) may be included. More particularly, $A^1$ and $A^2$ may be each independently an alkylene group of 1 to 10 carbon atoms, and more particularly, may be an alkylene group of 1 to 6 carbon atoms such as methylene, ethylene and propylene. The nearer the distance between an Si atom and an N atom in a molecule, the better the effect is, but if Si and N make a direct bond, the bond may be easily cleaved. As a result, the bond between Si and N may be cleaved during a post-treating process, and there is high probability of losing a secondary amino group thus generated during the post-treating process. In addition, the coupling with a silica filler in the finally prepared modified conjugated diene-based polymer is difficult due to the absence of an amino group which promotes the coupling with the silica filler, and as a result, the dispersing effect of a dispersant may be deteriorated. As described above, considering the excellent improving effect in accordance with the bond length between Si and N, $A^1$ and $A^2$ may be each independently an alkylene group of 1 to 3 carbon atoms such as methylene, ethylene and propylene, more particularly, methylene and ethylene, further more particularly, methylene.

In addition, $A^1$ and $A^2$ may be each independently substituted with one or two or more substituents selected from the group consisting of an alkyl group of 1 to 10 carbon atoms, a cycloalkyl group of 3 to 10 carbon atoms, an alkoxy group of 1 to 10 carbon atoms, a cycloalkoxy group of 4 to 10 carbon atoms, an aryl group of 6 to 12 carbon atoms, an aryloxy group of 6 to 12 carbon atoms, an alkanoyloxy group of 2 to 12 carbon atoms (RaCOO—, where Ra is an alkyl group of 1 to 9 carbon atoms), an arylalkyloxy group of 7 to 13 carbon atoms, an arylalkyl group of 7 to 13 carbon atoms, and an alkylaryl group of 7 to 13 carbon atoms, more particularly, may be substituted with one or two or more substituents selected from the group consisting of an alkyl group of 1 to 4 carbon atoms, a cycloalkyl group of 3 to 6 carbon atoms, an aryl group of 6 to 8 carbon atoms, an arylalkyl group of 7 to 10 carbon atoms, and an alkylaryl group of 7 to 10 carbon atoms, further more particularly, may be substituted with an alkyl group of 1 to 4 carbon atoms.

In addition, in Formula 1, $R^1$ to $R^4$ may be each independently selected from the group consisting of a substituted or unsubstituted alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, an arylalkyl group of 7 to 20 carbon atoms, and an alkylaryl group of 7 to 20 carbon atoms, more particularly, may be selected from the group consisting of a substituted or unsubstituted alkyl group of 1 to 10 carbon atoms, a cycloalkyl group of 3 to 10 carbon atoms, an aryl group of 6 to 12 carbon atoms, an alkylaryl group of 7 to 12 carbon atoms, and an arylalkyl group of 7 to 12 carbon atoms. More particularly, $R^1$ to $R^4$ may be each independently a substituted or unsubstituted alkyl group of 1 to 6 carbon atoms. In addition, $R^1$ to $R^4$ may be substituted with the substituents described referring to $A^1$ and $A^2$.

In addition, in Formula 1, $L^1$ to $L^4$ may be each independently a substituted or unsubstituted monovalent hydrocarbon group of 1 to 20 carbon atoms, particularly, may be selected from the group consisting of a substituted or unsubstituted alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, an arylalkyl group of 7 to 20 carbon atoms, and an alkylaryl group of 7 to 20 carbon atoms, more particularly, may be selected from the group consisting of a substituted or unsubstituted alkyl group of 1 to 10 carbon atoms, a cycloalkyl group of 3 to 10 carbon atoms, an aryl group of 6 to 12 carbon atoms, an alkylaryl group of 7 to 12 carbon atoms, and an arylalkyl group of 7 to 12 carbon atoms. More particularly, $L^1$ to $L^4$ may be each independently a substituted or unsubstituted alkyl group of 1 to 6 carbon atoms. In addition, $L^1$ to $L^4$ may be substituted with the substituents described referring to $A^1$ and $A^2$.

More particularly, the aminosilane-based compound of Formula 1 may be Formula 1 where $A^1$ and $A^2$ are each independently an alkylene group of 1 to 3 carbon atoms, $R^1$ to $R^4$ are each independently an alkyl group of 1 to 6 carbon atoms, and $L^1$ to $L^4$ are each independently an alkyl group of 1 to 6 carbon atoms.

Even more particularly, the aminosilane-based compound of Formula 1 may be a compound of Formulae 1a to 1c below, and one or a mixture of two thereof may be used.

[Formula 1a]

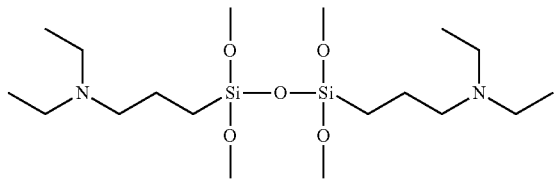

[Formula 1b]

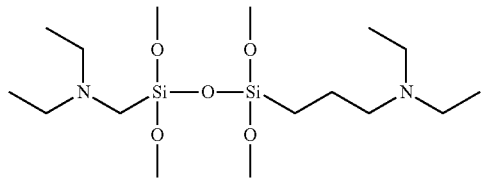

[Formula 1c]

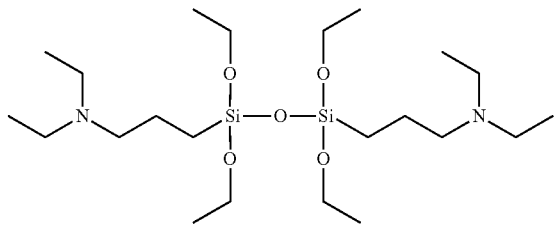

The aminosilane-based compound of Formula 1, having the above structure may be directly prepared using known chemical reaction or may be commercially available.

In addition, the styrene-based compound of Formula 2 may include a functional group having affinity with a filler, which is capable of improving the abrasion resistance and the processability of a rubber composition via the interaction with the filler.

In Formula 2, $R^5$ may be a hydrogen atom or an alkyl group of 1 to 3 carbon atoms.

In addition, D in Formula 2 may be a hydrocarbon group including N or O instead of one or more carbon atoms, or a hydrocarbon group in which one or more hydrogen atoms bonded to a carbon atom are substituted with N or O.

Particularly, D in Formula 2 may be an alkyl group of 1 to 5 carbon atoms or a cycloalkyl group of 3 to 5 carbon atoms, including N or O.

In addition, in Formula 2, k may be an integer of 0 to 5, particularly, an integer of 2 to 3.

More particularly, the substituted styrene-based compound of Formula 2 may be Formula 2 where $R^5$ is a hydrogen atom, D is an alkyl group of 1 to 3 carbon atoms or a cycloalkyl group of 3 to 5 carbon atoms, including N or O, and k is an integer of 2 to 3.

Even more particularly, the substituted styrene-based compound of Formula 2 may be a compound of Formula 2a below.

[Formula 2a]

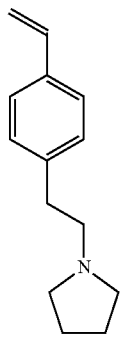

In addition, the conjugated diene-based polymer may be a homopolymer of a conjugated diene-based monomer, or a copolymer of a conjugated diene-based monomer and an aromatic vinyl-based monomer.

In addition, if the modified conjugated diene-based polymer is the copolymer, the copolymer may be a random copolymer in which structural units constituting the copolymer including a structural unit derived from a conjugated diene-based monomer and a structural unit derived from an aromatic vinyl-based monomer, are arranged and combined in disorder.

Particularly, the modified conjugated diene-based polymer may have narrow molecular weight distribution (Mw/Mn) (or referred to as polydispersity index (PDI)) of 1.1 to 3.0. If the molecular weight distribution of the modified conjugated diene-based polymer is greater than 3.0 or less than 1.1, and if the polymer is applied in a rubber composition, it is apprehended that tensile properties and viscoelasticity are degraded. Considering the remarkable improving effect of the tensile properties and viscoelasticity of the polymer in accordance with the control of molecular weight distribution, the molecular weight distribution of the modified conjugated diene-based polymer may particularly be 1.3 to 2.0. In addition, since the modified conjugated diene-based polymer uses the modifier, molecular weight distribution may be similar to that of a conjugated diene-based polymer prior to modification.

In the present invention, the molecular weight distribution of the modified butadiene-based polymer may be calculated from a ratio (Mw/Mn) of a weight average molecular weight (Mw) to a number average molecular weight (Mn). In this case, the number average molecular weight (Mn) is a common average of an individual polymer molecular weight, which is obtained by measuring the molecular weights of n polymer molecules, obtaining the total of the molecular weights and dividing the total by n. The weight average molecular weight (Mw) shows the molecular weight distribution of a polymer composition. The average value of all molecular weights may be expressed by gram per mol (g/mol).

In addition, in the present invention, each of the weight average molecular weight and the number average molecular weight is a polystyrene converted molecular weight analyzed by gel permeation chromatography (GPC).

In addition, the modified conjugated diene-based polymer may satisfy the molecular weight distribution conditions and have a number average molecular weight (Mn) of 50,000 g/mol to 2,000,000 g/mol, more particularly, 200,000 g/mol to 800,000 g/mol at the same time. In addition, the modified conjugated diene-based polymer may have a weight average molecular weight (Mw) of 100,000 g/mol to 4,000,000 g/mol, more particularly, 300,000 g/mol to 1,500,000 g/mol.

If the weight average molecular weight (Mw) of the modified conjugated diene-based polymer is less than 100,000 g/mol or the number average molecular weight (Mn) is less than 50,000 g/mol, and if the polymer is applied in a rubber composition, it is apprehended that tensile properties may be degraded. In addition, if the weight average molecular weight (Mw) is greater than 4,000,000 g/mol, or the number average molecular weight (Mn) is greater than 2,000,000 g/mol, the processability of the modified conjugated diene-based polymer may be degraded, the workability of a rubber composition may be deteriorated, and mixing and mulling may become difficult, and accordingly, sufficient improvement of the physical properties of the rubber composition may become difficult.

More particularly, if the modified conjugated diene-based polymer according to an embodiment of the present invention satisfies the molecular weight distribution together with the weight average molecular weight (Mw) and the number average molecular weight conditions at the same time, and if the polymer is brought in a rubber composition, the tensile properties, viscoelasticity and processability of the rubber composition may be improved in good balance without inclining to one of them.

In addition, the modified conjugated diene-based polymer may have the vinyl content of 5 wt % or more, particularly, 10 wt % or more, more particularly, 10 wt % to 60 wt % based on the total amount of the polymer. If the vinyl content is in the range, a glass transition temperature may be controlled in an appropriate range, and accordingly, when the modified conjugated diene-based polymer is applied in tires, physical properties required for tires such as running resistance and braking force may be improved.

In this case, the vinyl content represents the amount of the repeating unit of a structure derived from not 1,4-added but 1,2-added conjugated diene-based monomer by percent based on the total amount of the conjugated diene-based polymer which is composed of a vinyl group-containing monomer or a conjugated diene-based monomer.

In addition, the modified conjugated diene-based polymer according to an embodiment of the present invention has mooney viscosity (MV) of 40 to 140, particularly, 60 to 100 at 100° C. With the mooney viscosity in the range, excellent processability may be attained.

In the present invention, the mooney viscosity may be measured by using a mooney viscometer, for example, MV2000E of Monsanto Co., Ltd. using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for measurement.

According to another embodiment of the present invention, there is provided a method for preparing the modified conjugated diene-based polymer using the aminosilane-based compound of Formula 1 and a modification initiator composition including the substituted styrene-based compound of Formula 2.

The preparation method according to an embodiment of the present invention is characterized in including reacting a substituted styrene-based compound of Formula 2 and an organo-alkali metal compound in a hydrocarbon solvent to prepare a modification initiator composition (step 1); performing polymerization reaction of conjugated diene-based monomers, or a conjugated diene-based monomer and an aromatic vinyl-based monomer in the presence of the modified initiator composition to prepare an active polymer (step 2); and reacting the active polymer and an aminosilane-based compound of Formula 1 (step 3).

Step 1 is a step for preparing a modification initiator composition, and may be performed by reacting a substituted styrene-based compound and an organo-alkali metal compound in a hydrocarbon solvent. In this case, the modification initiator composition may include a modification initiator compound of a structure in which an alkali metal derived from an organo-alkali metal compound is introduced in an oligomer of the substituted styrene-based compound.

The hydrocarbon solvent is not specifically limited and may be, for example, at least one selected from the group consisting of n-pentane, n-hexane, n-heptane, isooctane, cyclohexane, toluene, benzene and xylene.

The organo-alkali metal compound may be used from 0.01 mmol to 10 mmol based on total 100 g of the monomers. Particularly, the organo-alkali metal compound may be used from 0.05 mmol to 5 mmol, more particularly, from 0.1 mmol to 3 mmol, further more particularly, from 0.1 mmol to 2 mmol based on 100 g of the monomers.

The organo-alkali metal compound is not specifically limited but may be, for example, at least one selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

The substituted styrene-based compound may be used from 0.1 mol to 3.0 mol based on 1 mol of the organo-alkali metal compound.

Step 2 is a step for preparing an active polymer in which a functional group derived from the substituted styrene-based compound and an alkali metal are coupled, and may be performed by polymerizing conjugated diene-based monomers, or an aromatic vinyl-based monomer and a conjugated diene-based monomer in the presence of the modification initiator composition.

That is, in the preparation method according to an embodiment of the present invention, a polymer main chain may be formed and a functional group derived from the substituted styrene-based compound may be introduced in one terminal at the same time by polymerizing monomers using the modification initiator composition. Accordingly, the polymerization of step 2 may be a first modification step.

The polymerization of step 2 may use a conjugated diene-based monomer alone, or a conjugated diene-based monomer and an aromatic vinyl-based monomer together, as the monomers. That is, the polymer prepared via the preparation method according to an embodiment of the present invention may be a homopolymer of a conjugated diene-based monomer, or a copolymer derived from a conjugated diene-based monomer and an aromatic vinyl-based monomer.

The conjugated diene-based monomer is not specifically limited, but may be at least one selected from the group consisting of, for example, 1,3-butadiene, 2,3-dimethyl-1,3-butadiene, piperylene, 3-butyl-1,3-octadiene, isoprene, and 2-phenyl-1,3-butadiene.

If the conjugated diene-based monomer and the aromatic vinyl-based monomer are used together as the monomers, the conjugated diene-based monomer may be used in an amount such that the derived unit of the conjugated diene-based monomer in a finally prepared modified conjugated diene-based polymer is 60 wt % or more, particularly 60 wt % to 90 wt %, more particularly, 60 wt % to 85 wt %.

The aromatic vinyl-based monomer is not specifically limited but may be, for example, at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

If the conjugated diene-based monomer and the aromatic vinyl-based monomer are used together as the monomers, the aromatic vinyl-based monomer may be used in an amount such that an amount of the derived unit of the aromatic vinyl-based monomer in a finally prepared modified conjugated diene-based polymer is 40 wt % or less, particularly, from 10 wt % to 40 wt %, more particularly, from 15 wt % to 40 wt %.

The reaction of step 1 and the polymerization of step may be conducted by further adding a polar additive, respectively, as needed, and the polar additive may be added in an amount of 0.001 parts by weight to 1.0 part by weight based on 100 parts by weight of the total monomers. Particularly, the addition amount may be from 0.005 parts by weight to 0.5 parts by weight, more particularly, from 0.01 parts by weight to 0.3 parts by weight based on total 100 parts by weight of the monomers.

The polar additive may be at least one selected from the group consisting of tetrahydrofuran, ditetrahydrofurylpropane, diethyl ether, cycloamyl ether, dipropyl ether, ethylene dimethyl ether, diethyl glycol, dimethyl ether, tert-butoxy ethoxy ethane, bis(3-dimethylaminoethyl)ether, (dimethylaminoethyl) ethyl ether, trimethylamine, triethylamine, tripropylamine, and tetramethylethylenediamine.

In the preparation method according to an embodiment of the present invention, if a conjugated diene-based monomer and an aromatic vinyl-based monomer are copolymerized, the difference of the reaction rates therebetween may be compensated by the addition of the polar additive, thereby inducing easy formation of a random copolymer.

The polymerization of step 2 may be performed by an adiabatic polymerization, or an isothermal polymerization.

Here, the adiabatic polymerization means a polymerization method including a step of polymerization using self-generated heat of reaction without optionally applying heat after adding an organo-alkali metal compound. The isothermal polymerization means a polymerization method in which the temperature of a polymer is kept constant by optionally applying or taking heat after adding an organo-alkali metal compound.

The polymerization may be performed in a temperature range of −20° C. to 200° C., particularly, 0° C. to 150° C., more particularly, 10° C. to 120° C.

Step 3 is a modification reaction step of reacting the active polymer and the aminosilane-based compound of Formula 1 to prepare a modified conjugated diene-based polymer.

In this case, the aminosilane-based compound of Formula 1 may be used in a ratio of 0.1 mol to 2.0 mol with respect to 1 mol of the organo-alkali metal compound.

The reaction of step 3 is a modification reaction for introducing a functional group in a polymer, and each reaction may be performed in a temperature range of 0° C. to 90° C. for 1 minute to 5 hours.

The preparation method according to an embodiment of the present invention may further include at least one step of recovering and drying of solvents and unreacted monomers after step 3, if needed.

Further, according to another embodiment of the present invention, there is provided a rubber composition including the modified conjugated diene-based polymer.

The rubber composition includes the modified conjugated diene-based polymer, and the physical properties of molded articles may be improved, particularly, fuel consumption properties, abrasion properties and braking properties in tires may be improved in good balance.

Particularly, the rubber composition may include the modified conjugated diene-based polymer in an amount of 0.1 wt % to 100 wt %, particularly, 10 wt % to 100 wt %, more particularly 20 wt % to 90 wt %. If the amount of the modified conjugated diene-based polymer is less than 0.1 wt %, improving effects of fuel consumption properties, abrasion resistance and braking properties of a molded article, for example, a tire manufactured by using the rubber composition may be insignificant.

In addition, the rubber composition may further include other rubber components, if necessary, in addition to the modified conjugated diene-based polymer, and, in this case, the rubber component may be included in an amount of 90 wt % or less based on the total amount of the rubber composition. Specifically, the rubber composition may be included in an amount of 1 part by weight to 900 parts by weight based on 100 parts by weight of the modified conjugated diene-based copolymer.

The rubber component may be a natural rubber or a synthetic rubber, and the rubber component may be, for example, a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture of at least two thereof may be used.

In addition, the rubber composition may include a filler of 0.1 parts by weight to 150 parts by weight based on 100 parts by weight of the modified conjugated diene-based polymer.

The filler may particularly be a silica-based filler or a carbon black-based filler, and one or a mixture of two thereof may be used.

More particularly, the filler may be silica, further more particularly, wet silica (hydrated silicate), dry silica (anhydrous silicate), calcium silicate, aluminum silicate, or colloid silica. More particularly, the filler may be wet silica which has the most significant improving effect of destruction characteristics and compatible effect of wet grip.

Meanwhile, if a silica-based filler is used as the filler, a silane coupling agent may be used together for the improvement of reinforcing and low exothermic properties.

The silane coupling agent may particularly include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of at least two thereof may be used. More particularly, the silane coupling agent may be bis(3-triethoxysilylpropyl)polysulfide or 3-trimethoxysilylpropylbenzothiazyltetrasulfide in consideration of the improving effect of reinforcing properties.

In addition, in the rubber composition according to an embodiment of the present invention, since a modified conjugated diene-based polymer in which a functional group having high affinity with a silica-based filler is introduced in an active part is used as a rubber component, the mixing amount of the silane coupling agent may be smaller than a common case. In particular, the silane coupling agent may be used in an amount of 1 part by weight to 20 parts by weight based on 100 parts by weight of the silica-based filler. With the amount used in the above range, effects as a coupling agent may be sufficiently exhibited, and the gelation of a rubber component may be prevented. More particularly, the silane coupling agent may be used in an amount of 5 parts by weight to 15 parts by weight based on 100 parts by weight of silica.

In addition, the rubber composition according to an embodiment of the present invention may be sulfur cross-linkable, and so may further include a vulcanizing agent.

The vulcanizing agent may particularly be a sulfur powder and may be included in an amount of 0.1 parts by weight to 10 parts by weight based on 100 parts by weight of a rubber component. With the amount used in the above range, elasticity and strength required for a vulcanized rubber composition may be secured, and at the same time, a low fuel consumption ratio may be attained.

In addition, the rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator is not specifically limited and may particularly include thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG). The vulcanization accelerator may be included in an amount of 0.1 parts by weight to 5 parts by weight based on 100 parts by weight of the rubber component.

In addition, the process oil acts as a softener in a rubber composition and may particularly include a paraffin-based, naphthene-based, or aromatic compound. More particularly, an aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. With the above-described amount, the deterioration of the tensile strength and low exothermic properties (low fuel consumption ratio) of the vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature. The antiaging agent may be used in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. In addition, a rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, and a bead coating rubber, or to the manufacture of rubber products in various industries such as a dustproof rubber, a belt conveyor, and a hose.

Also, according to another embodiment of the present invention, there is provided a molded article and a tire manufactured using the rubber composition.

Hereinafter, the present invention will be explained in more detail referring to embodiments and experimental embodiments. However, the following embodiments and experimental embodiments are only for the illustration of the present invention, and the scope of the present invention is not limited thereto.

Example 1

To a 500 ml andrew bottle maintaining 20° C. in an oil bath, 1.28 g of a substituted styrene-based compound of Formula 2a below was injected, and 64 g of anhydrous n-hexane, 0.41 g of n-butyllithium, and 1.28 g of N,N,N',N'-tetramethylethylenediamine (TMEDA) as a polar additive were added thereto, followed by shaking the bottle for 10 minutes to perform the reaction to prepare a modification initiator composition.

To a 20 L autoclave reactor, 212.5 g of styrene, 605.63 g of 1,3-butadiene, and 4,242 g of anhydrous n-hexane were injected, followed by stirring for 5 minutes while maintaining 40° C. The modified initiator composition thus prepared was injected thereto and an adiabatic reaction with heating was performed. After 30 minutes, 31.88 g of 1,3-butadiene was injected for capping the terminals of a polymer with butadiene. After 5 minutes, 5.24 g of a 30 wt % anhydrous n-hexane solution of an aminosilane-based compound of Formula 1a below was injected, and the reaction was conducted for 15 minutes ([TMEDA]/[n-butyllithium]=1.6 molar ratio, [Formula 2a]/[n-butyllithium]=1.0 molar ratio, and [Formula 1a]/[n-butyllithium]=0.58 molar ratio). Then, the reaction was quenched by using ethanol, and 14 g of a solution in which 30 wt % of Wingstay K antioxidant was dissolved in hexane was added thereto. Then, the polymer thus obtained was injected into hot water heated using steam and stirred to remove solvents, followed by roll drying to remove remaining solvents and water to prepare a modified styrene-butadiene copolymer.

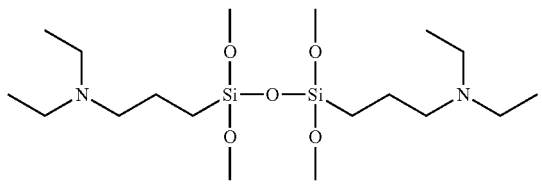

(1a)

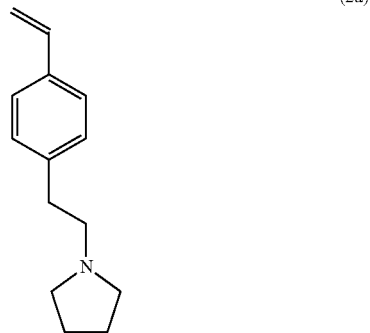

(2a)

Example 2

A modified styrene-butadiene copolymer was prepared by conducting the same method as in Example 1 except for using 4.93 g of a 30 wt % anhydrous n-hexane solution of a compound of Formula 1b below instead of the compound of Formula 1a [Formula 1b]/[n-butyllithium]=0.58 molar ratio).

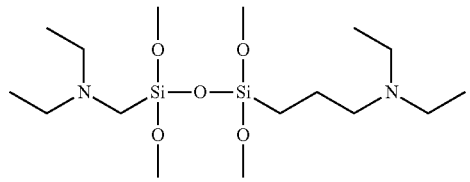

(1b)

Example 3

A modified styrene-butadiene copolymer was prepared by conducting the same method as in Example 1 except for using 5.95 g of a 30 wt % anhydrous n-hexane solution of a compound of Formula 1c below instead of the compound of Formula 1a [Formula 1c]/[n-butyllithium]=0.58 molar ratio).

(1c)

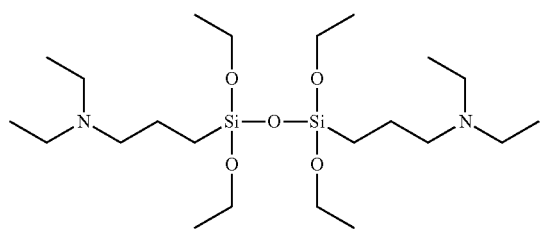

Example 4

A modified styrene-butadiene copolymer was prepared by conducting the same method as in Example 1 except for using 7.88 g of a 30 wt % anhydrous n-hexane solution of the compound of Formula 1a ([Formula 1a]/[n-butyllithium] =0.87 molar ratio).

Comparative Example 1

To a 20 L autoclave reactor, 212.5 g of styrene, 605.63 g of 1,3-butadiene, 4,242 g of anhydrous n-hexane, and 1.18 g of N,N,N',N'-tetramethylethylenediamine (TMEDA) as a polar additive were added, and the internal temperature of the reactor was elevated to 40° C. When the internal temperature of the reactor reached 40° C., 3.50 mmol of n-butyllithium was injected into the reactor, and an adiabatic reaction with heating was performed. After 30 minutes, 31.88 g of 1,3-butadiene was injected. And after 5 minutes, 1.74 mmol of silicon tetrachloride (SiCl$_4$) was injected, and the reaction was performed for 15 minutes further. The reaction was quenched using ethanol and 14 g of a solution in which 30 wt % of Wingstay K antioxidant was dissolved in hexane was added. The polymer thus obtained was injected into hot water heated with steam, stirred to remove solvents, and roll dried to remove remaining solvents and water to prepare a styrene-butadiene copolymer.

Comparative Example 2

To a 500 ml andrew bottle maintaining 20° C. in an oil bath, 64 g of anhydrous n-hexane, 0.41 g of n-butyllithium, and 1.28 g of N,N,N',N'-tetramethylethylenediamine (TMEDA) as a polar additive were added, followed by shaking the bottle for 10 minutes to perform the reaction to prepare an initiator composition.

To a 20 L autoclave reactor, 212.5 g of styrene, 605.63 g of 1,3-butadiene, and 4,242 g of anhydrous n-hexane were injected, followed by stirring for 5 minutes while maintaining 40° C. The initiator composition thus prepared was injected thereto and an adiabatic reaction with heating was performed. After 30 minutes, 31.88 g of 1,3-butadiene was injected for capping the terminals of a polymer with butadiene. After 5 minutes, 5.24 g of a 30 wt % anhydrous n-hexane solution of an aminosilane-based compound of Formula 1a below was injected, and the reaction was conducted for 15 minutes ([TMEDA]/[n-butyllithium]=1.6 molar ratio, [Formula 1a]/[n-butyllithium]=0.58 molar ratio). Then, the reaction was quenched using ethanol, and 14 g of a solution in which 30 wt % of Wingstay K antioxidant was dissolved in hexane was added thereto. Then, the polymer thus obtained was injected into hot water heated using steam and stirred to remove solvents, followed by roll drying to remove remaining solvents and water to prepare a modified styrene-butadiene copolymer.

(1a)

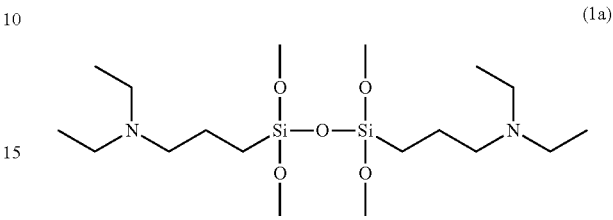

Comparative Example 3

A modified styrene-butadiene copolymer was prepared by conducting the same method as in Comparative Example 2 except for using 7.88 g of a 30 wt % anhydrous n-hexane solution of the aminosilane-based compound of Formula 1a ([Formula 1a]/[n-butyllithium]=0.87 molar ratio).

Comparative Example 4

A modified styrene-butadiene copolymer was prepared by conducting the same method as in Example 1 except for using a compound of Formula (i) below instead of the aminosilane-based compound of Formula 1a ([Formula (i)]/[n-butyllithium]=0.58 molar ratio).

(i)

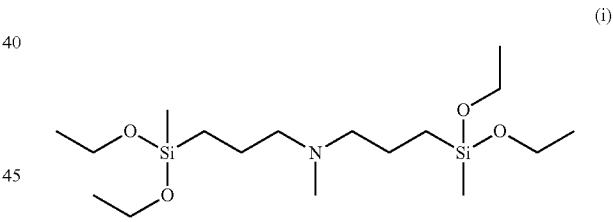

Experimental Example 1

A weight average molecular weight (Mw), a number average molecular weight (Mn), molecular weight distribution (or polydispersity index (PDI)), styrene derived unit and vinyl contents, and mooney viscosity (MV) were measured for each of the copolymers of Example 1 to Example 4, and Comparative Example 1 to Comparative Example 4. The results are shown in Table 1 below.

1) Styrene Derived Unit and Vinyl Contents

The styrene derived unit (SM) and vinyl contents in each copolymer were measured using NMR.

2) Analysis of Molecular Weights

The weight average molecular weight (Mw) and the number average molecular weight (Mn) of each copolymer were measured by gel permeation chromatography (GPC) analysis in conditions of 40° C. In this case, two columns of PLgel Olexis and one column of PLgel mixed-C of Polymer Laboratories Co. Ltd. were used in combination, and newly replaced columns were all mixed bed type columns. In addition, polystyrene (PS) was used as a GPC standard material for calculating the molecular weights. The polydispersity index (PDI) was calculated from the ratio (Mw/Mn) of the weight average molecular weight and the number average molecular weight measured by the above method.

3) Analysis of Mooney Viscosity

The mooney viscosity of each copolymer was measured by using MV-2000 (Alpha Technologies Co., Ltd.) at 100° C. for 4 minutes after pre-heating two specimens, of which amount was 15 g or more each, for 1 minute.

the first compound mixture was cooled to room temperature, and 1.75 parts by weight of a rubber accelerator (CZ), 1.5 parts by weight of a sulfur powder, and 2.0 parts by weight of a vulcanization accelerator were added to the mulling apparatus and mixed at a temperature of 60° C. or less to obtain a second compound mixture. Then, in the third stage mulling, the second compound mixture was molded and vulcanized at 180° C. for t90+10 minutes using a vulcanization press to prepare each vulcanized rubber.

2) Tensile Properties

The tensile properties were measured by manufacturing each specimen (thickness 25 mm, length 80 mm) and measuring tensile strength when broken and tensile stress

TABLE 1

| | Division | Example 1 | Example 2 | Example 3 | Example 4 | Comparative Example 1 | Comparative Example 2 | Comparative Example 3 | Comparative Example 4 |
|---|---|---|---|---|---|---|---|---|---|
| | Substituted styrene-based compound | 2a | 2a | 2a | 2a | — | — | — | 2a |
| | Modifier | 1a | 1b | 1c | 1a | — | — | — | i |
| | Mooney viscosity (MV) | 87 | 84 | 86 | 98 | 92 | 84 | 96 | 88 |
| NMR | Styrene content (wt % based on total polymer) | 25 | 25 | 24 | 24 | 25 | 25 | 25 | 25 |
| | Vinyl content (wt % based on total polymer) | 51 | 50 | 51 | 50 | 52 | 50 | 51 | 48 |
| GPC | Mw (X $10^4$ g/mol) | 55 | 52 | 53 | 64 | 59 | 53 | 66 | 57 |
| | Mn (X $10^4$ g/mol) | 36 | 36 | 36 | 42 | 38 | 37 | 43 | 38 |
| | PDI (Mw/Mn) | 1.52 | 1.43 | 1.48 | 1.52 | 1.55 | 1.44 | 1.55 | 1.51 |

Experimental Example 2

In order to comparatively analyze the physical properties of rubber compositions including each copolymer of Example 1 to Example 4, and Comparative example 1 to Comparative Example 4, and molded articles manufactured therefrom, tensile properties and viscoelasticity properties were measured.

1) Preparation of Rubber Composition

Each rubber composition was prepared via a first stage mulling, a second stage mulling and a third stage mulling. In this case, the amounts used of materials excluding a copolymer were shown based on 100 parts by weight of the copolymer. In the first stage mulling, 100 parts by weight of each copolymer, 70 parts by weight of silica, 11.02 parts by weight of bis(3-triethoxysilylpropyl)tetrasulfide as a silane coupling agent, 33.75 parts by weight of a process oil (TDAE), 2.0 parts by weight of an antiaging agent (TMDQ), 2.0 parts by weight of an antioxidant, 3.0 parts by weight of zinc oxide (ZnO), 2.0 parts by weight of stearic acid, and 1.0 part by weight of wax were mixed and mulled under conditions of 80 rpm by using a banbury mixer equipped with a temperature controlling apparatus. In this case, the temperature of the mulling apparatus was controlled, and a first compound mixture was obtained at a discharge temperature of 140° C. to 150° C. In the second stage mulling, when elongated by 300% (300% modulus) of each specimen according to an ASTM 412 tensile test method. Particularly, a Universal Test Machin 4204 tensile tester (Instron Co., Ltd.) was used, and measurement of tensile properties was performed at room temperature at a rate of 50 cm/min, to obtain a tensile strength and a tensile stress value when elongated by 300% (300% modulus). Each value of the physical properties are listed in Table 2 on the basis of 100 of the value of Comparative Example 1, and the higher the value is, the better the properties are.

3) Viscoelasticity Properties

The viscoelasticity properties were measured by using a dynamic mechanical analyzer (TA Co., Ltd.). Tan δ was measured by changing deformation with a twist mode and a frequency of 10 Hz at each measurement temperature (0° C. to 60° C.). Payne effect (ΔG') was shown as the difference between a minimum value and a maximum value at deformation of 0.07% to 40%, and if the Payne effect decreases, it means that the dispersibility of a filler is excellent. In addition, if the tan δ at a low temperature of 0° C. is high, it means that braking properties against wet surface is excellent, and if the tan δ at a high temperature of 60° C. is low, it means that hysteresis loss is small, and low rolling resistance (fuel consumption ratio) is excellent. Each value of the physical properties are listed in Table 2 on the basis of 100 of the value of Comparative Example 1, and the higher the value is, the better the properties are.

TABLE 2

| Division | Example 1 | Example 2 | Example 3 | Example 4 | Comparative Example 1 | Comparative Example 2 | Comparative Example 3 | Comparative Example 4 |
|---|---|---|---|---|---|---|---|---|
| ΔG' (MPa) | 0.30 | 0.32 | 0.31 | 0.28 | 0.54 | 0.36 | 0.34 | 0.31 |
| Tensile strength (Index) | 110 | 109 | 108 | 114 | 100 | 104 | 106 | 106 |
| 300% modulus (Index) | 104 | 103 | 104 | 106 | 100 | 102 | 104 | 104 |
| Tan δ @ 0° C. (Index) | 119 | 118 | 120 | 123 | 100 | 112 | 114 | 116 |
| Tan δ @ 60° C. (Index) | 126 | 126 | 122 | 133 | 100 | 116 | 119 | 119 |

In the results of Table 2, it was found that molded articles (specimens) manufactured from rubber compositions including the modified styrene-butadiene copolymers of Example 1 to Example 4, which were prepared using the modification initiator compositions prepared using the substituted styrene-based compound according to the present invention and the aminosilane-based compound as modifiers, show largely decreased values of Payne effect (ΔG') when compared to a molded article manufactured from a rubber composition including the unmodified styrene-butadiene copolymer of Comparative Example 1.

The result indicates that the dispersibility of silica (filler) in the rubber compositions including the modified styrene-butadiene copolymers of Example 1 to Example according to the present invention is better than the dispersibility of silica in the rubber composition of Comparative Example 1. As a result, it is found that the modified styrene-butadiene copolymers of Example 1 to Example 4 according to the present invention show excellent affinity with a filler, and a functional group having affinity with a filler is present in the modified styrene-butadiene copolymers of Example 1 to Example 4 according to exemplary embodiments the present invention.

That is, from the result, it is found that the modified styrene-butadiene copolymer according to an embodiment of the present invention introduces functional groups having affinity with a filler, derived from the aminosilane-based compound of Formula 1 and the substituted styrene-based compound of Formula 2 in the copolymer via the modification by the aminosilane-based compound of Formula 1 and the substituted styrene-based compound of Formula 2. In addition, with respect to the tensile strength, 300% modulus, braking properties against wet surface (0° C. tan δ), and low rolling resistance (60° C. tan δ), molded articles manufactured from the rubber compositions including the modified styrene-butadiene copolymers of Example 1 to Example 4 show markedly improved properties than a molded article manufactured from the rubber composition including the unmodified styrene-butadiene copolymer of Comparative Example 1.

In addition, molded articles manufactured from the rubber compositions including the modified styrene-butadiene copolymers of Comparative Example 2 and Comparative Example 3, which were modified but did not use the modified initiation composition prepared using the substituted styrene-based compound according to the present invention, showed decreased tensile strength and 300% modulus, and largely decreased braking properties against wet surface (0° C. tan δ) and low rolling resistance (60° C. tan δ).

Also, the rubber composition including the modified styrene-butadiene copolymer of Comparative Example 4, which was prepared not using the aminosilane-based compound according to the present invention but another compound as a modifier, and a molded article manufactured therefrom, showed similar or somewhat decreased tensile strength and 300% modulus, and largely decreased braking properties against wet surface (0° C. tan δ) and low rolling resistance (60° C. tan δ), particularly, low rolling resistance (60° C. tan δ) when compared to the rubber composition including the modified styrene-butadiene copolymer of Example 1 and a molded article manufactured therefrom.

The invention claimed is:

1. A modified conjugated diene-based polymer comprising a functional group derived from an aminosilane-based compound of the following Formula 1 and a functional group derived from a substituted styrene-based compound of the following Formula 2:

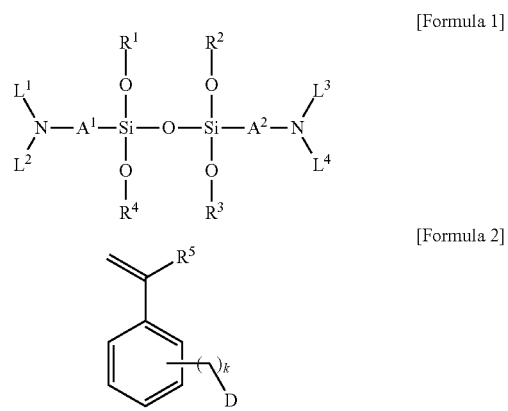

in Formula 1 or Formula 2, $A^1$ and $A^2$ are each independently a substituted or unsubstituted divalent hydrocarbon group of 1 to 20 carbon atoms, $R^1$ to $R^4$ are each independently a substituted or unsubstituted monovalent hydrocarbon group of 1 to 20 carbon atoms, $L^1$ to $L^4$ are each independently a substituted or unsubstituted monovalent hydrocarbon group of 1 to 20 carbon atoms, $R^5$ is a hydrogen atom or a monovalent hydrocarbon group of 1 to 3 carbon atoms, D is a monovalent hydrocarbon group of 1 to 5 carbon atoms, comprising N or O, and k is an integer of 0 to 5.

2. The modified conjugated diene-based polymer of claim 1, wherein in Formula 1, $A^1$ and $A^2$ are each independently selected from the group consisting of a substituted or unsubstituted alkylene group of 1 to 20 carbon atoms, an arylene group of 6 to 20 carbon atoms, and —[(X)$_n$—(Y)$_m$]— (where X and Y are each independently a substituted or unsubstituted alkylene group of 1 to 20 carbon atoms or an arylene group of 6 to 20 carbon atoms, X and Y are not the same, and m and n are each independently an integer of 1 to 3).

3. The modified conjugated diene-based polymer of claim 1, wherein in Formula 1, $R^1$ to $R^4$ are each independently selected from the group consisting of a substituted or unsubstituted alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, an arylalkyl group of 7 to 20 carbon atoms, and an alkylaryl group of 7 to 20 carbon atoms.

4. The modified conjugated diene-based polymer of claim 1, wherein in Formula 1, $L^1$ to $L^4$ are each independently selected from the group consisting of a substituted or unsubstituted alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, an arylalkyl group of 7 to 20 carbon atoms, and an alkylaryl group of 7 to 20 carbon atoms.

5. The modified conjugated diene-based polymer of claim 1, wherein in Formula 1,
$A^1$ and $A^2$ are each independently an alkylene group of 1 to 3 carbon atoms,
$R^1$ to $R^4$ are each independently an alkyl group of 1 to 6 carbon atoms, and
$L^1$ to $L^4$ are each independently an alkyl group of 1 to 6 carbon atoms.

6. The modified conjugated diene-based polymer of claim 1, wherein the aminosilane-based compound is one selected from the group consisting of the following Formulae 1a to 1c, or a mixture of two or more thereof:

[Formula 1a]
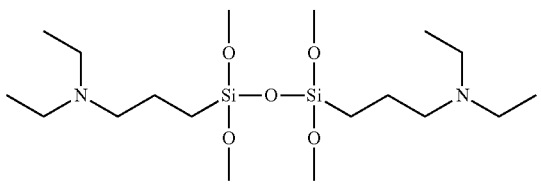

[Formula 1b]
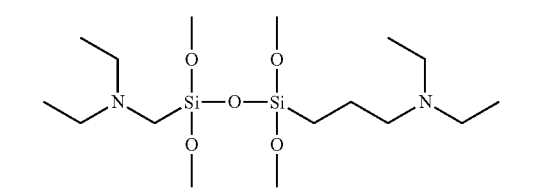

[Formula 1c]
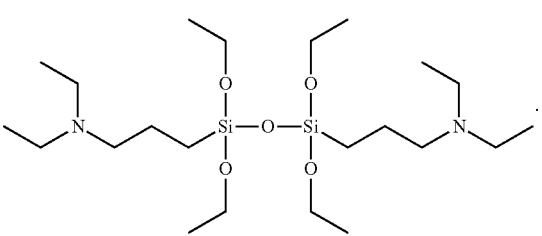

7. The modified conjugated diene-based polymer of claim 1, wherein the substituted styrene-based compound of Formula 2 is a compound of the following Formula 2a:

[Formula 2a]
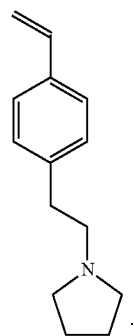

8. The modified conjugated diene-based polymer of claim 1, wherein the modified conjugated diene-based polymer is a modified polymer of a conjugated diene-based polymer selected from the group consisting of a homopolymer of a conjugated diene-based monomer; and a copolymer of a conjugated diene-based monomer and an aromatic vinyl-based monomer.

9. The modified conjugated diene-based polymer of claim 1, wherein the modified conjugated diene-based polymer has a number average molecular weight of 50,000 g/mol to 2,000,000 g/mol, a weight average molecular weight of 100,000 g/mol to 4,000,000 g/mol, and molecular weight distribution of 1.1 to 3.0.

10. The modified conjugated diene-based polymer of claim 1, wherein the modified conjugated diene-based polymer has a mooney viscosity of 40 to 140 at 100° C.

11. A method for preparing the modified conjugated diene-based polymer of claim 1, the method comprising:
1) reacting a substituted styrene-based compound of the following Formula 2 and an organo-alkali metal compound in a hydrocarbon solvent to prepare a modification initiator composition;
2) performing polymerization reaction of conjugated diene-based monomers, or a conjugated diene-based monomer and an aromatic vinyl-based monomer in the presence of the modification initiator composition to prepare an active polymer; and
3) reacting the active polymer and an aminosilane-based compound of the following Formula 1:

[Formula 1]
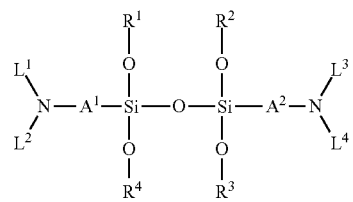

[Formula 2]
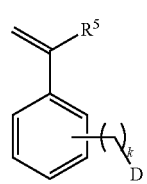

in Formula 1 or Formula 2, $A^1$ and $A^2$ are each independently a substituted or unsubstituted divalent hydrocarbon group of 1 to 20 carbon atoms, $R^1$ to $R^4$ are each independently a substituted or unsubstituted monovalent hydrocarbon group of 1 to 20 carbon atoms, $L^1$ to $L^4$ are each independently a substituted or unsubstituted monovalent hydrocarbon group of 1 to 20 carbon atoms, $R^5$ is a hydrogen atom or a monovalent hydrocarbon group of 1 to 3 carbon atoms, D is a monovalent hydrocarbon group of 1 to 5 carbon atoms, comprising N or O, and k is an integer of 0 to 5.

12. The method for preparing the modified conjugated diene-based polymer of claim 11, wherein the substituted styrene-based compound is used from 0.1 mol to 3.0 mol based on 1 mol of the organo-alkali metal compound.

13. The method for preparing the modified conjugated diene-based polymer of claim 11, wherein the aminosilane-based compound is used from 0.1 mol to 2.0 mol based on 1 mol of the organo-alkali metal compound.

14. A rubber composition comprising the modified conjugated diene-based polymer according to claim 1.

15. The rubber composition of claim 14, wherein the rubber composition further comprises a filler of 0.1 parts by weight to 150 parts by weight based on 100 parts by weight of the modified conjugated diene-based polymer.

* * * * *